US008628418B2

(12) United States Patent
Abbott

(10) Patent No.: US 8,628,418 B2
(45) Date of Patent: Jan. 14, 2014

(54) METHOD AND APPARATUS FOR OPERATING A MOBILE GAMING SYSTEM

(75) Inventor: Eric L. Abbott, Las Vegas, NV (US)

(73) Assignee: IGT, Reno, NV (US)

( * ) Notice: Subject to any disclaimer, the term of this patent is extended or adjusted under 35 U.S.C. 154(b) by 401 days.

(21) Appl. No.: 11/418,343

(22) Filed: May 3, 2006

(65) Prior Publication Data

US 2007/0270224 A1 Nov. 22, 2007

(51) Int. Cl.
*A63F 13/00* (2006.01)
*A63F 9/24* (2006.01)

(52) U.S. Cl.
USPC .............................................. 463/40; 463/39

(58) Field of Classification Search
USPC .................................................... 463/40, 39
See application file for complete search history.

(56) References Cited

U.S. PATENT DOCUMENTS 5,072,381 A 12/1991 Richardson et al.
5,770,533 A 6/1998 Franchi
5,967,895 A 10/1999 Kellen
5,999,808 A 12/1999 LaDue
6,283,860 B1 * 9/2001 Lyons et al. .................... 463/36
6,445,794 B1 9/2002 Shefi
6,508,709 B1 1/2003 Karmarkar
6,508,710 B1 1/2003 Paravia et al.
6,645,027 B2 11/2003 Miller
6,702,672 B1 3/2004 Angell et al.
6,811,488 B2 11/2004 Paravia et al.
6,846,238 B2 1/2005 Wells
6,884,162 B2 4/2005 Raverdy et al.
6,959,259 B2 10/2005 Vock et al.
6,971,956 B2 12/2005 Rowe et al.
7,035,626 B1 4/2006 Luciano
2002/0132663 A1 * 9/2002 Cumbers ......................... 463/25
2003/0064794 A1 4/2003 Mead et al.
2003/0064805 A1 * 4/2003 Wells .............................. 463/39
2003/0104865 A1 6/2003 Itkis et al.
2004/0123903 A1 * 7/2004 Cline ............................ 137/272
2006/0177109 A1 8/2006 Storch
2007/0060305 A1 * 3/2007 Amaitis et al. .................. 463/25
2007/0190494 A1 * 8/2007 Rosenberg ...................... 434/11

OTHER PUBLICATIONS

Butterfield, Fox; "Losing Shirt At Casino Pool (It's Wireless)"; New York Times; 2 pages; Jul. 2, 2005.
"G2E to shine spotlight on Internet gaming"; GamingToday; 2 pages; Mar. 29, 2005.
"Nevada eyes wireless casino gaming"; GamingToday; May 17, 2005; 3 pages.

(Continued)

*Primary Examiner* — Dmitry Suhol
*Assistant Examiner* — Marcus Jones
(74) *Attorney, Agent, or Firm* — Griffiths & Seaton PLLC

(57) ABSTRACT

A method and apparatus for operating a mobile gaming system is disclosed. The mobile gaming system establishes areas where mobile gaming is prohibited based on authorized elevations. One embodiment of a mobile gaming device used in conjunction with the system comprises an elevation recognition element to identify the elevation at which the device is being used. The mobile gaming device further comprises a comparator programmed with or configured to receive elevations associated with areas of permitted gaming. The elevation identified by the elevation recognition element registers with the comparator and if a comparison determines that the mobile gaming device is at an elevation where gaming is prohibited, a disabling element operates to disable presentation of a wagering game on the mobile gaming device. In one embodiment, the elevation recognition element is an altimeter.

21 Claims, 5 Drawing Sheets

(56) References Cited

OTHER PUBLICATIONS

"Regulators OK high-tech cell system"; GamingToday; May 31, 2005; 2 pages.
"New regs draw (mostly) positive comments"; GamingToday; Nov. 1, 2005; 3 pages.
"Wireless gaming poised for approval"; GamingToday; Nov. 29, 2005; 4 pages.
Legislators to discuss top 2006 issues; GamingToday; Dec. 27, 2005; 2 pages.
"Looking forward"; GamingToday; Dec. 27, 2005; 4 pages.
"Shuffle Master launches wireless gaming products"; GamingToday; Feb. 14, 2006.
Regulation 5 Operation of Gaming Establishments Adoption of New Regulation 5.220: Operation of a Mobile Gaming System; Author Unknown; Jan. 11, 2006; 3 pages.
"Cisco Wireless Location Appliance"; Cisco Systems, Inc.; brochure; 1992-2006; 14 pages.
"Cantor Mobile Gaming"; Cantor Gaming; flyer; 2 pages; Date unknown.
"Diamond I, Inc DMOI"; Internet research; 2 pages; Date Unknown.
"Remote gaming: Brave New World for Players"; GamingToday; 2 pages; May 18, 2004.

* cited by examiner

METHOD AND APPARATUS FOR OPERATING A MOBILE GAMING SYSTEM

1. FIELD OF THE INVENTION

The present invention relates to the gambling and wagering industry and, in particular, to a mobile gaming device with elevation detection configured for selective operation based on elevation.

2. BACKGROUND OF THE INVENTION

The traditional business of gaming entices patrons to visit casinos to play a variety of games on gaming machines or at gaming tables located within a defined area of the casino structure. In an effort to continue to expand gaming opportunities for its patrons, casinos, as well as other operators of gambling activities, are continually looking for ways to expand gaming opportunities for patrons.

As a brief background, it is well known that race and sports books can receive wagers from bettors in remote locations. Such remotely operated book operations have typically been established outside of the borders of the United States to avoid gambling limitations under federal oversight. The State of Nevada, which has long had legal book operations, recently established intrastate book capabilities whereby, had legal book operations, recently established intrastate book capabilities whereby, from a location within the state, but remote from the book operation, a bettor can make wagers on sporting events, such as for example a horse race or football/basketball game. The bettor initially sets up an account with the book operation by depositing money to establish a fund with which to bet. The bettor can then dial a pre-dedicated phone number established by the book operation and follow the spoken prompts to make a wager. Alternatively, the bettor can use a computer to go on-line and follow visual prompts to interactively make a wager.

In either case, in order to conform to state laws and regulations, the book operation must ensure that the bettor is in fact within the borders of the state of Nevada. This is typically done by using well-known locating means, such as telephone number identification systems.

As state legislatures liberalize laws in the realm of traditional casino gaming, gaming operators seek ways for patrons to participate in slot-type and table-type gaming in locations away from the traditional casino floor area. Accordingly, gaming operators embrace mobile gaming technology as a means to expand their business. Mobile gaming, as is known in the art, generally involves the use of devices having wireless capabilities that facilitate the play of slot-type games, video poker, blackjack and other traditional games away from the casino floor, such as at locations other than fixed gaming tables and fixed gaming machines.

In the state of Nevada mobile gaming is permitted but legislation and associated regulation places restrictions on its implementation. Minors are not allowed to gamble and consequently, the implementation of mobile gaming must include restrictions that will substantially eliminate the likelihood of minors being able to privately or surreptitiously use mobile gaming devices.

In order for casino personnel to most efficiently monitor use of mobile gaming devices, it is expected that mobile gaming be limited to public spaces on the casino property. Indeed, at this time, new regulations in the State of Nevada only allow mobile gaming in areas where a gaming device may lawfully be operated, which under the regulations necessarily includes areas under an approved surveillance system. Conversely, mobile gaming is prohibited in private places, such as hotel rooms, where patrons are granted their privacy and consequently are not being monitored. Thus, gaming operators need to ensure that mobile gaming is not occurring in prohibited areas.

There is therefore a need to develop a gaming device that, in addition to providing mobile gaming capabilities, can meet the gaming laws and regulations regarding mobile gaming. The present invention is directed to a method and apparatus that accomplishes this purpose, as well as providing additional benefits and advantages.

SUMMARY OF THE INVENTION

The advantages and other novel features of the invention will be set forth in part in the description that follows and in part will become apparent to those skilled in the art upon examination of the following or may be learned with the practice of the invention.

To achieve the foregoing, and in accordance with the disclosure that follows, a mobile gaming system is provided. In one embodiment, the device comprises a housing having a wireless interface configured to transmit information to, and receive information from, a server. The device further includes a user interface configured to receive information from a user. A display screen is incorporated and configured to display information to a user. The mobile gaming device further has a memory configured to store machine readable code and a microprocessor configured to execute machine readable code.

In an important aspect of the invention, the mobile gaming device includes an elevation recognition element. In conjunction with the other components, the elevation recognition element implements a key function in the operation of the mobile gaming device.

One embodiment of the mobile gaming device comprises a comparator configured to perform a comparison of an elevation recognized by the elevation recognition element with one or more allowed elevations, which may have been previously set for permitted gaming operation. The coordinated operation of the elevation recognition element and the comparator facilitates compliance with rules and regulations that have been adopted to implement mobile gaming systems.

More particularly, it has always been impermissible for minors, i.e. those under a certain age, which varies from jurisdiction to jurisdiction, to gamble. Moreover, it is a goal of many jurisdictions to maintain openness in gaming. Hence, casinos have traditionally allowed gaming in open and public areas, which can easily be monitored. It can be easily seen that the prohibition against gambling by minors and the desire to maintain a public gaming environment is much more difficult to monitor with a mobile gaming system. To assist in that regard, gaming operators, per regulatory instruction, prohibit gaming in certain areas. While these areas are defined by each casino or jurisdiction, such areas often comprise areas that are difficult to monitor or are non-public.

One such non-public area is the hotel rooms of the property. Since most hotels are currently built as high-rise towers, it is recognized that, in general, the areas where gaming is permitted is at a different elevation in relation to the elevation of the hotel rooms. The mobile gaming device disclosed herein incorporates an elevation recognition element and a comparator to perform a comparison of an elevation recognized by the elevation recognition element with one or more predefined elevations to identify when the device is in an area in which gaming is prohibited.

In a further preferred aspect of the invention, the mobile gaming device comprises a disabling element configured to disable the presentation of a wagering game in response to the comparison. Accordingly, if the mobile gaming device recognizes, i.e. is located at, an elevation that has been established as corresponding to a prohibited gaming area, the disabling element operates according to its intended function and no further gaming is permitted using the device.

In another embodiment of the invention, the comparator includes an adjustment element capable of adjusting or offsetting the detected elevation of the mobile gaming device to account for the height of the user. With this embodiment, the adjustment element performs its function before a decision occurs regarding whether to allow continued gaming.

In one embodiment of the invention, the elevation recognition element comprises an altimeter. One alternate embodiment of the altimeter contemplates determining elevation by measuring air pressure. Another alternative embodiment contemplates the altimeter operating with radar characteristics. More particularly, this form of altimeter may include a radio signal emitter. The radio signal emitter is configured to emit a radio signal and measure the length of time taken for the signal to reflect from a surface back to the emitter. In one embodiment, the altimeter may comprise a Global Positioning signal (GPS) type system. While these forms of altimeters are sufficient to perform the function required for the mobile gaming device, other alternative forms of altimeters that function to determine elevation are considered well within the scope of the present invention.

The present invention further contemplates a distinctive system for providing mobile gaming. The inventive mobile gaming system comprises a master server configured to receive, store and transmit information about a user. The system includes at least one mobile gaming device that includes a housing, a wireless interface configured to transmit information to, and receive information, from the master server and a user interface configured to receive information from a user. The device used in the mobile gaming system further includes a display screen configured to display information to the user. Also incorporated into the device is a memory configured to store machine readable code and a microprocessor configured to execute machine readable code.

As described above, the device used in the mobile gaming system of the present invention includes an elevation recognition element. As used with the system, the mobile gaming device, in a one embodiment, also incorporates a comparator configured to perform a comparison of an elevation determined by the elevation recognition element, at which the device is located, with one or more elevations associated with a range in which gaming is permitted. The mobile gaming device further comprises a disabling element configured to disable presentation of a wagering game in response to the comparison. Consequently, the mobile gaming system of the present invention diligently operates in accordance with rules and regulations to prohibit gaming in areas at which gaming is not allowed, i.e. unauthorized areas.

In a further embodiment of the system, the mobile gaming device used in the system described herein further includes an adjustment element or feature configured to adjust the comparison based on the height of the user. This promotes precise operation by taking into account users of varying heights, such as for example users in a wheelchair.

In a further aspect of the invention, the mobile gaming device used in the system of the present invention includes an elevation recognition element that comprises an altimeter. In one embodiment of the invention, the altimeter operates by measuring air pressure. In an alternative embodiment, the altimeter operates by using radar techniques. More specifically, the altimeter includes a radio signal emitter. In operation, the emitter sends out a radio signal and measures the length of time taken for the radio signal to reflect from a surface back to the emitter.

In yet another aspect of the invention, a method of operating a mobile gaming system is presented. The method comprises the step of establishing an area where mobile gaming is permitted (authorized areas) and programming into the system or servers the elevation or elevation range of the authorized areas. The method further incorporates the step of providing at least one mobile gaming device that includes an elevation recognition element. The method also comprises permitting operation of the mobile gaming device when the elevation recognition element recognizes or detects an elevation within a permitted elevation range. Hence, when an authorized elevation is detected, then operation of the mobile gaming device to present a wagering game is enabled.

Alternatively, the method does not permit gaming when the elevation recognition element recognizes an elevation outside of the one or more permitted elevation ranges. Thus the method of the present invention operates in accordance with the rules and regulations established for mobile gaming.

As with the device itself and the system in which it is used, the method contemplates, in one embodiment, that the elevation recognition element comprises an altimeter. As described above, the altimeter in an exemplary aspect is configured to measure air pressure. Alternatively, the altimeter comprises a radio signal emitter. The emitter used in the inventive method is configured to emit a radio signal and measure the length of time for the radio signal to reflect from a surface back to the emitter.

Still other advantages of the present invention will become apparent to those skilled in this art from the following description wherein there is shown and described a preferred embodiment of this invention, simply by way of the figures. As will be realized, the invention is capable of other different embodiments and its several details are capable of modification in various aspects all without departing from the invention. Accordingly, the drawings and descriptions will be regarded as illustrative in nature and not as restrictive.

BRIEF DESCRIPTION OF THE DRAWINGS

The accompanying drawings incorporating in and forming a part of this specification illustrates several aspects of the present invention and together with the description serves to explain the principles of the invention. In the drawings.

Reference will now be made in detail to the present preferred embodiment of the invention, an example of which is illustrated in the accompanying drawing.

DETAILED DESCRIPTION OF THE INVENTION

Figure 1:
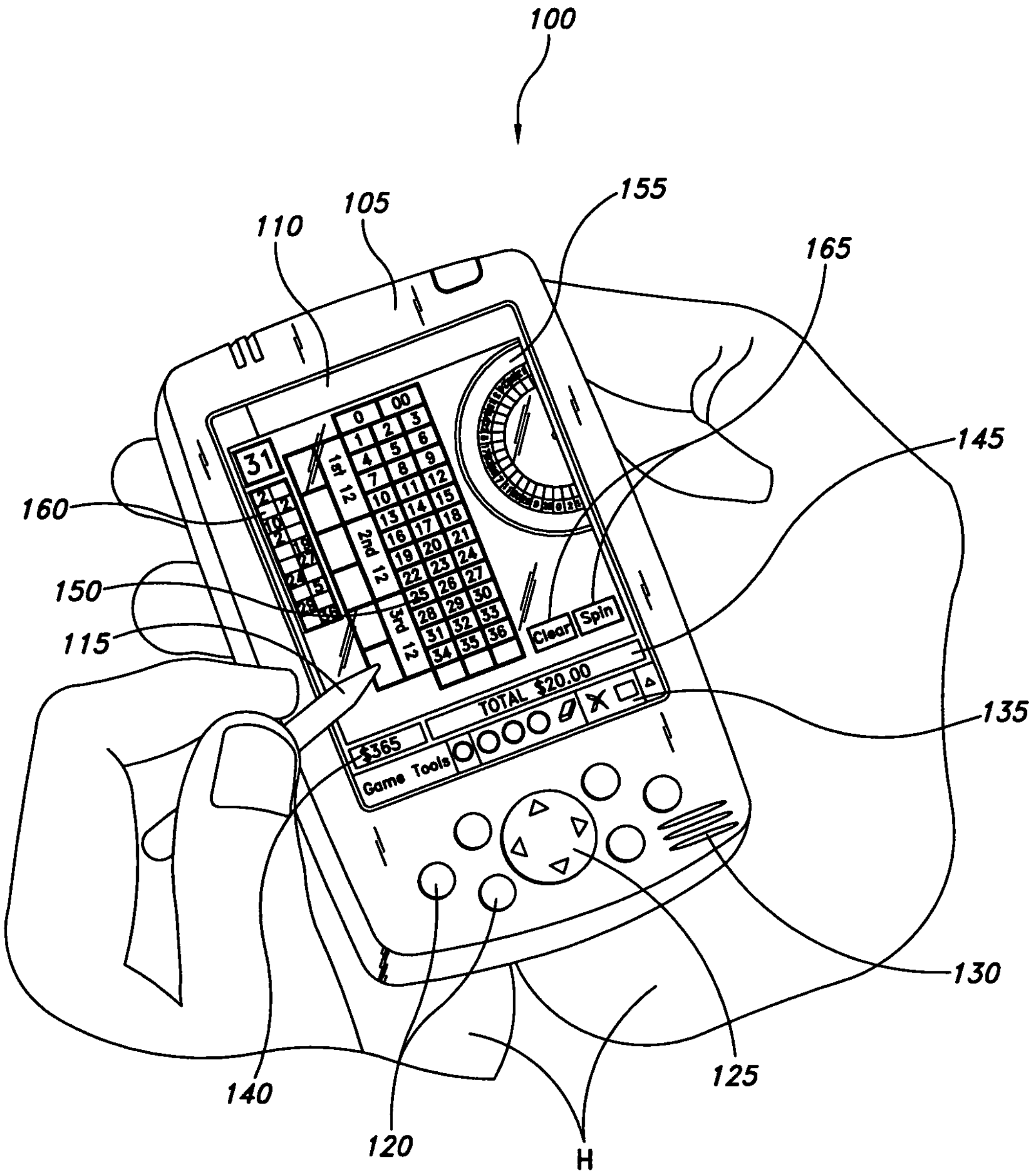
FIG. 1 presents a perspective view of a mobile gaming device.

Reference is now made to the figures, and particularly, to FIG. 1 illustrating a mobile gaming device 100 in its operating environment. As shown, the device 100 comprises a housing 105 having a high-quality display screen 110 for viewing various visual applications presented by the device.

The mobile gaming device 100 is shown cradled in the hands H of a user along with a stylus 115 that may be used to interact with touch points on the display screen 110. It can thus be appreciated that the device 100, which includes a built-in antenna (not shown), is easily and efficiently handled and functionally portable to promote its function in mobile gaming. The embodiment of the mobile gaming device 100 illustrated in FIG. 1 takes the form of a personal digital assistant or PDA. Other configurations that provide for portability are within the scope of the invention as well, an example of which, without limitation, is a tablet computer or any other portable device capable of elevation detection.

The mobile gaming device 100 is shown with function keys 120 and a program selector 125 that may be used, for instance, to select the type of game a user wishes to play and the format in which the game is presented. It should be understood that the mobile gaming device 100 may incorporate function keys on different areas of the housing than illustrated in FIG. 1, or alternatively, may be incorporated as a part of a system program that may be actuated on the display screen. In addition, a speaker/microphone 130 is illustrated on the housing 105, although, as with the function keys, the mobile gaming device can come with or without this feature.

The display screen 110 further shows a tool bar 135 utilized for system instructions and assistance. An account field 140 is shown to provide to the user a running total of the amount that the user has available to wager. Adjacent the account field 140 is shown a current bet field 145 that provides an indication to the user of how much money has been wagered for the present game.

When in gaming mode, the display screen 110 presents the particulars of the game chosen for play. In the illustration of FIG. 1, the selected game is roulette. More particularly, a roulette layout 150, similar to the layout found on roulette tables in a conventional casino, is depicted. A roulette wheel 155 is partially shown within the display screen 110. Further, an indicator board 160 is illustrated to identify, in similar fashion to games played at a conventional roulette table, the list of winning numbers in previous games. Touch points on the display screen 110 may also offer operational icons 165 such as those shown.

Figure 2:
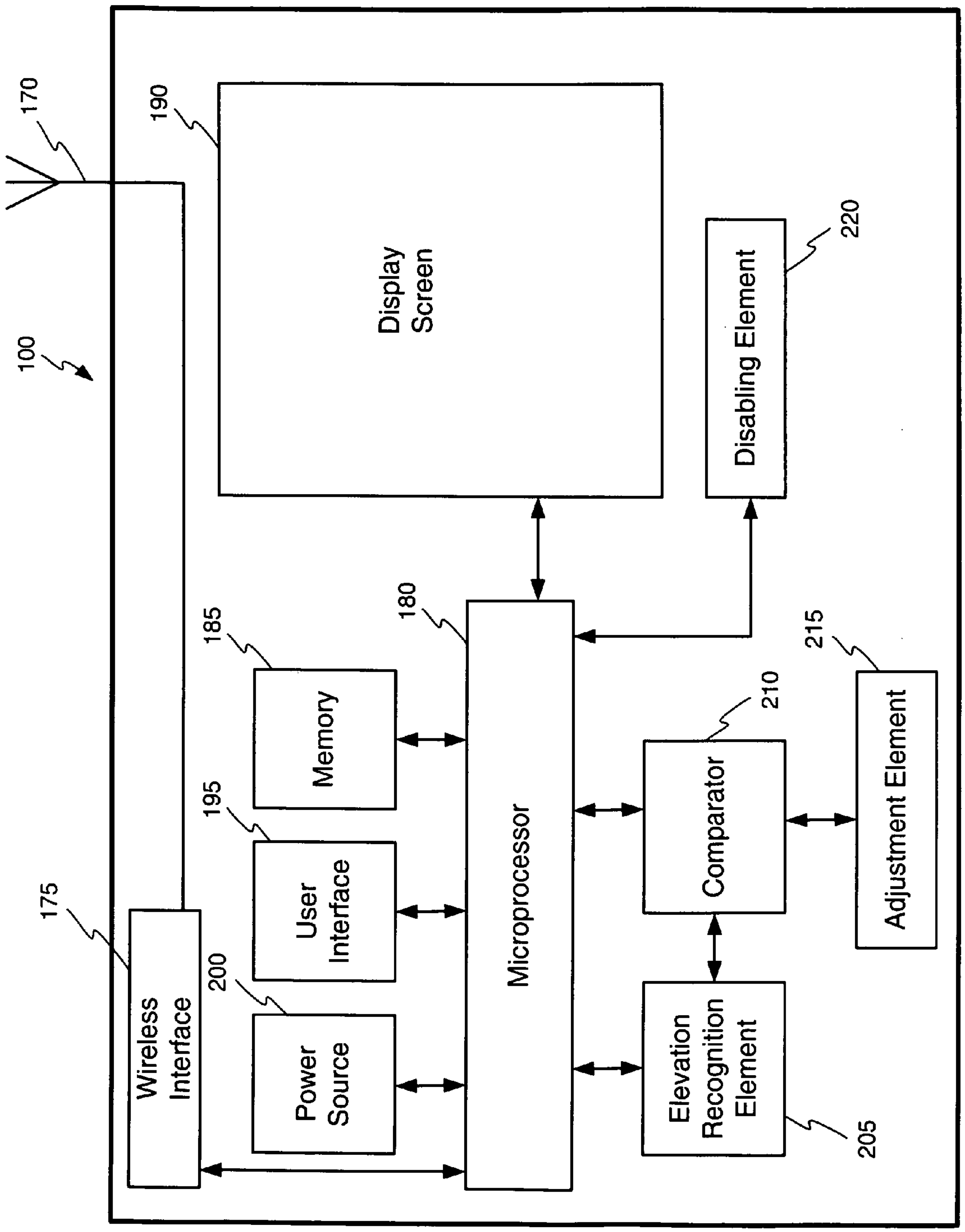
FIG. 2 presents a block diagram of an example embodiment of the mobile gaming device.

The mobile gaming device 100 is illustrated in block diagram form in FIG. 2, showing important functional components thereof. It should be noted that this is but one example embodiment, and other embodiments, which do not depart from the scope of the invention, may be enabled. In addition, the various features described herein may be enabled alone or in combination. It is important to reiterate that the mobile gaming device 100 may comprise any type of device capable of receiving and displaying information to a user that is received from a remote location.

As shown in FIG. 2, the mobile gaming device 100 is embodied to communicate over a wireless network. Accordingly, the mobile gaming device 100 includes an antenna 170 which connects to a wireless interface 175. The antenna 170 and wireless interface 175 operate in unison to receive signals transmitted from a remote location. As described above, other systems and methods for communication with a remote location are possible. The wireless interface 175 may perform such operations as decoding, demodulation, and other processing necessary to receive and transmit information in communication with a remote location.

A microprocessor 180 or other computing device such as, without limitation, DSP, ARM or ASIC connects to the wireless interface 175 to perform an analysis and processing on data. The microprocessor 180 also connects to or communicates with a memory 185, a display screen 190 (analogous to display screen 110 in FIG. 1) and a user interface 195. The memory 185 may comprise any form of memory capable of storing data. In various embodiments, the memory 185 may comprise RAM, ROM, hard disk drive, flash memory, optical memory, CD or DVD ROM or a CD-RW media. In one embodiment of the mobile gaming device 100, the memory 185 is configured to store any and all of data, software code and programs, video data, pictures, graphics, machine readable code and processor executable logic code.

The display screen 190 may comprise any type of system configured to display information to a user. In one embodiment, the display screen 190 incorporates touch screen capability for use by a user with a stylus, such as that identified by numeral 115 in FIG. 1, or other pointing device to convey instructions through interactive input. The mobile gaming device 100 may further include a microphone, such as that identified as 130 in FIG. 1, or other similar device in combination with a voice recognition system configured to allow a user to provide voice commands to the mobile gaming device 100 to thereby control operation.

The user interface 195 may optionally be included to provide access to additional systems for a user to enter information to the mobile gaming device 100. The user interface 195 may comprise a track ball or mouse-type device, function keys or buttons (as in those identified as 120 and 125 in FIG. 1), a keyboard, microphone/speaker (i.e., numeral 130 in FIG. 1), voice recognition system, pointing device, or any other device or system capable of receiving input from a user.

A power source 200 connects to the microprocessor 180 to provide power for operation as is known in the art. Although not shown, it is contemplated that the power source 200 may also connect to other systems or components of the mobile gaming device 100 as necessary to facilitate operation.

In operation, the mobile gaming device receives information over the antenna 170 and the wireless interface 175. Upon receipt, the microprocessor 180 may process the data to reformat the received data for viewing on the display screen 190 or for use by a user. The data received by the microprocessor 180 via the antenna 170 and interface 175 may be stored either temporarily or permanently in the memory 185.

The mobile gaming device 100 may further be configured using the systems shown in FIG. 2 to receive user input. More particularly, a user may provide user input to the system via the user interface 195 or a touch-equipped display screen 190. Any type of information may be received from a user and it likewise may be stored in memory 185 and/or transmitted to a server for processing and further storage.

In preparation for further discussion regarding the components of the mobile gaming device 100, it is important to remember that traditionally gaming has been offered only in public areas, such as in bars and on the casino floor. Since mobile gaming is intended to allow the participation in gaming activities beyond the traditional casino floor, monitoring responsibilities become significantly more difficult. Regulations have been put in to place that identify and permit gaming in certain public areas, while likewise identifying prohibited gaming in areas that are more private and more difficult to monitor. One possible reason gaming may be limited to certain areas is to prevent minors from wagering, or to prevent other types of fraud or illegal activity.

Under current regulations, one prohibited gaming area is in hotel rooms of a hotel/casino complex. As can be appreciated by those who visit gaming locations, the hotel rooms in hotel/casino complexes are almost universally located in high-rise towers. Thus, the elevation of these hotel rooms is different from the elevation of the public areas where gaming is permitted.

In an important aspect of the invention, the mobile gaming device 100 incorporates an elevation recognition element 205. The elevation recognition element 205 is contemplated as being any mechanical or electronic system that can recognize and identify the elevation of an object above a fixed level using measurement techniques. In one embodiment of the invention, the elevation recognition element 205 takes the form of an altimeter. An exemplary embodiment of an altimeter used in the mobile gaming device 100 is a barometric altimeter of well-known type. A barometric altimeter operates by measuring the air pressure at a static port in the device 100. Since air pressure decreases with an increase in elevation, the barometric altimeter may be calibrated to recognize the air pressure directly as an elevation.

In an alternative embodiment of the invention, the elevation recognition element 205 comprises a radar altimeter. A radar altimeter makes use of a radio signal emitter to measure elevation. More specifically, the radar altimeter emits a radio signal and then measures the time taken for the radio signal to reflect from a surface back to the emitter. This allows for measurement of an exact distance, i.e. the elevation above ground level. In one embodiment, a GPS-based altitude determination system may be utilized.

Working in conjunction with the elevation recognition element 205 is a comparator 210. For use in the mobile gaming device 100, the comparator 210 is programmed with one or more elevations or elevation ranges that correspond to areas of permitted gaming, i.e. authorized gaming areas. The elevations corresponding to areas in which gaming is permitted establish one or more authorized elevations. A comparison may occur between the one or more authorized elevations and the elevation recognized by the elevation recognition element 205. Generally, but not exclusively, the areas of permitted gaming consist of those public spaces that are found at ground level in hotel/casino complexes. Such areas include the traditional casino floor, restaurants and bars near the casino floor, shopping areas that are accessible to pedestrian traffic and the public pool areas located on the grounds of the property. While most areas of permitted gaming will be located at ground level, as well more described in detail in conjunction with FIG. 4, it is contemplated that gaming may be permitted in areas at other elevations as well.

Accordingly, in operation, the comparator 210 is programmed with authorized or baseline elevations that correspond to elevations associated with permitted gaming areas. During operation of the mobile gaming device 100, the elevation recognition element 205 identifies the elevation at which the device 100 is located. This elevation is then compared to the one or more authorized elevations or elevation ranges that are programmed into the comparator 210. It is contemplated that the authorized elevations may be stored in the mobile gaming device 100 or on a server. It is further contemplated that the comparison may occur at the server based on information received from the mobile gaming device 100. Continued game play is dependent on the result of the comparison, namely, that the mobile gaming device 100 is located at an authorized elevation.

In one embodiment of the mobile gaming device 100 of the present invention, the comparator 210 incorporates an adjustment element 215. The function of the adjustment element 215 is to normalize or offset the comparison procedure by taking into account the height of the user or any other factor that may require an offset. Thus, when a user obtains a mobile gaming device 100, the adjustment element 215 is programmed in such a manner that a user's height does not skew the comparison procedure and thereby results in the mobile gaming device 100 becoming inoperable.

Summarizing the operation of this aspect of the present invention, the elevation recognition element 205 and the comparator 210 work in unison and in conjunction with the microprocessor 180 to make a determination as to whether the mobile gaming device is in an area of permitted gaming or an area of prohibited gaming. Alternatively, the determination may occur at one or more servers, which are discussed below.

In a further embodiment of the invention, the mobile gaming device 100 includes a disabling element 220. The disabling element 220 operates to disable a presentation of a wagering game if it is determined that the mobile gaming device is in an area of prohibited gaming based on the cooperative operation of the elevation recognition element 205 and the comparator 210. As will be described further below, it is specifically contemplated that the disabling element 220 does not prevent the mobile gaming device 100 from continuing to provide concierge or non-wagering advertising or entertainment operations if incorporated into the system. The disabling element 220 may be enabled in hardware, such as a switch, software or a combination of both.

Figure 3:
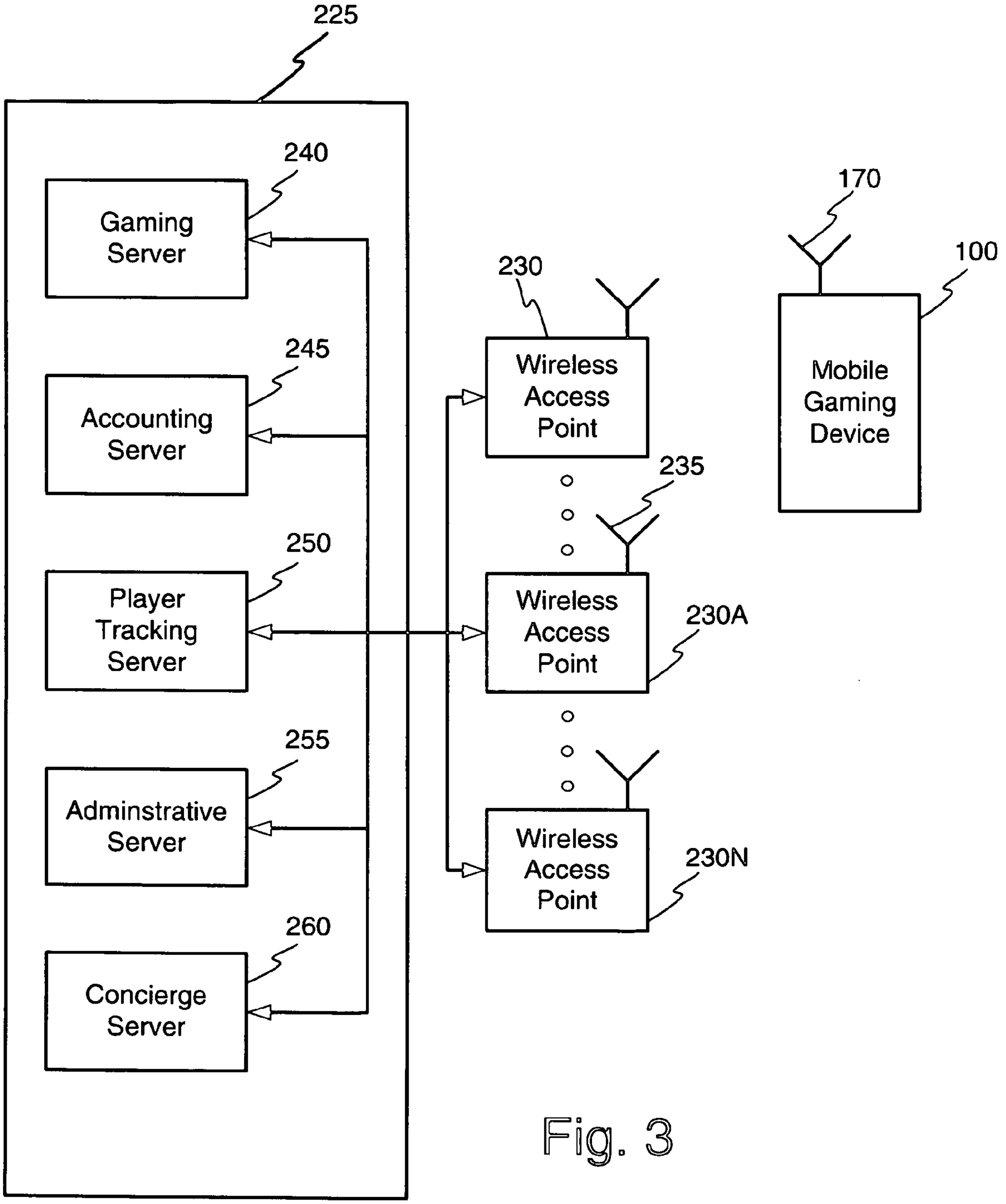
FIG. 3 presents a block diagram of an example embodiment of the mobile gaming system using a mobile gaming device of the type illustrated in FIG. 2.

With reference to FIG. 3, it is contemplated that a mobile gaming system practiced in accordance with the present invention may be controlled by or in communication with a master server 225. The master server 225 comprises any type of computer system capable of storing data and providing data to one or more users over a network. The master server 225 may also provide processing operations. In one embodiment, the master server 225 includes database systems to store data regarding slot-type and other casino games, such as video poker, roulette, blackjack, craps or any other wagering event.

The master server 225 communicates with a plurality of wireless access points 230, each having an antenna 235 to transmit and receive communications. Any number of wireless access points 230 may be provided as designated by wireless access points 230A through 230N, where N comprises any whole number. It is contemplated that the wireless access points 230 communicate with the master server 225 through hard-wired connections as shown, although it is within the scope of the invention to have any form of wired or wireless communication between the access points and the server.

The wireless access points 230 operate to communicate over wireless channels with one or more mobile gaming devices 100 that are provided for use with a mobile gaming system. Any type of wireless transmission may be implemented including, but not limited to, radio or other frequency or electromagnetic energy, optical and infrared-type communication. Moreover, the wireless communication may occur under any type of standard or protocol, such as AMPS, IS-95, GSM, COPD, Mohitex, Ardis, IEEE 802.11, GPRS, UMTS, Bluetooth and/or other similar protocols.

The master server 225 may incorporate a variety of component servers that promote the useful operation of the mobile gaming system of the present invention. More specifically, a gaming server 240 is provided to facilitate the operation of the games accessed by a user on the mobile gaming device 100. The master server 225 may include database systems to store and transmit information related to the individual games available to the user through the mobile gaming system or, alternatively, simply be programmed to determine a winning play and/or an appropriate payout. In the latter embodiment, the mobile gaming device 100 is pre-loaded with software for the games to achieve the functionality herein.

An accounting server 245 may be provided to receive, store and transmit information relating to a user's account. More particularly, a user desiring to participate in mobile gaming initially establishes an account with the gaming operator and deposits funds in the account with which to wager. This initial investment is recorded in the accounting server 245. It is contemplated that the accounting server 245 keeps track of individual bets made by the user to note the draw down in the user's account, as well as replenishment deposits made by the user at various times.

A player tracking server 250 may be provided to assist in determining the location of a user when using the mobile gaming device 100. The player tracking server 250 may be configured in accordance with traditional player tracking programs which monitor player gaming and provide player rewards. The player tracking server 250 may also be configured with software that aids in the decision as to whether or not to permit continued gaming or disable the mobile gaming device 100. For instance, the player tracking server 250 may receive information gathered by elevation recognition element 205/comparator 210 combination to be further processed toward the presentation of a wagering game. The player tracking server 250 may also be configured with other locating means, such as GPS elements, to facilitate other location operations.

The master server 225 may further have an administrative server 255 that keeps track of such things as expenditures associated with the user's stay at the hotel/casino complex. For instance, the administrative server 255 may receive, store and transmit information regarding the user's hotel bill, restaurant charges, shopping charges, and the like.

Further, the master server 225 may have a concierge server 260 that may be configured with the appropriate software to provide for such things as making reservations at the restaurants affiliated with the location, purchasing tickets for entertainment events, and scheduling such things as side trips to satellite tourist locations and/or sport outings. It should be noted here that concierge server 260 continuously operates to provide concierge services even if the mobile gaming system, in other operations, determines that a user is in an area where gaming is prohibited and hence the mobile gaming device 100 is wager disabled.

Figure 4:
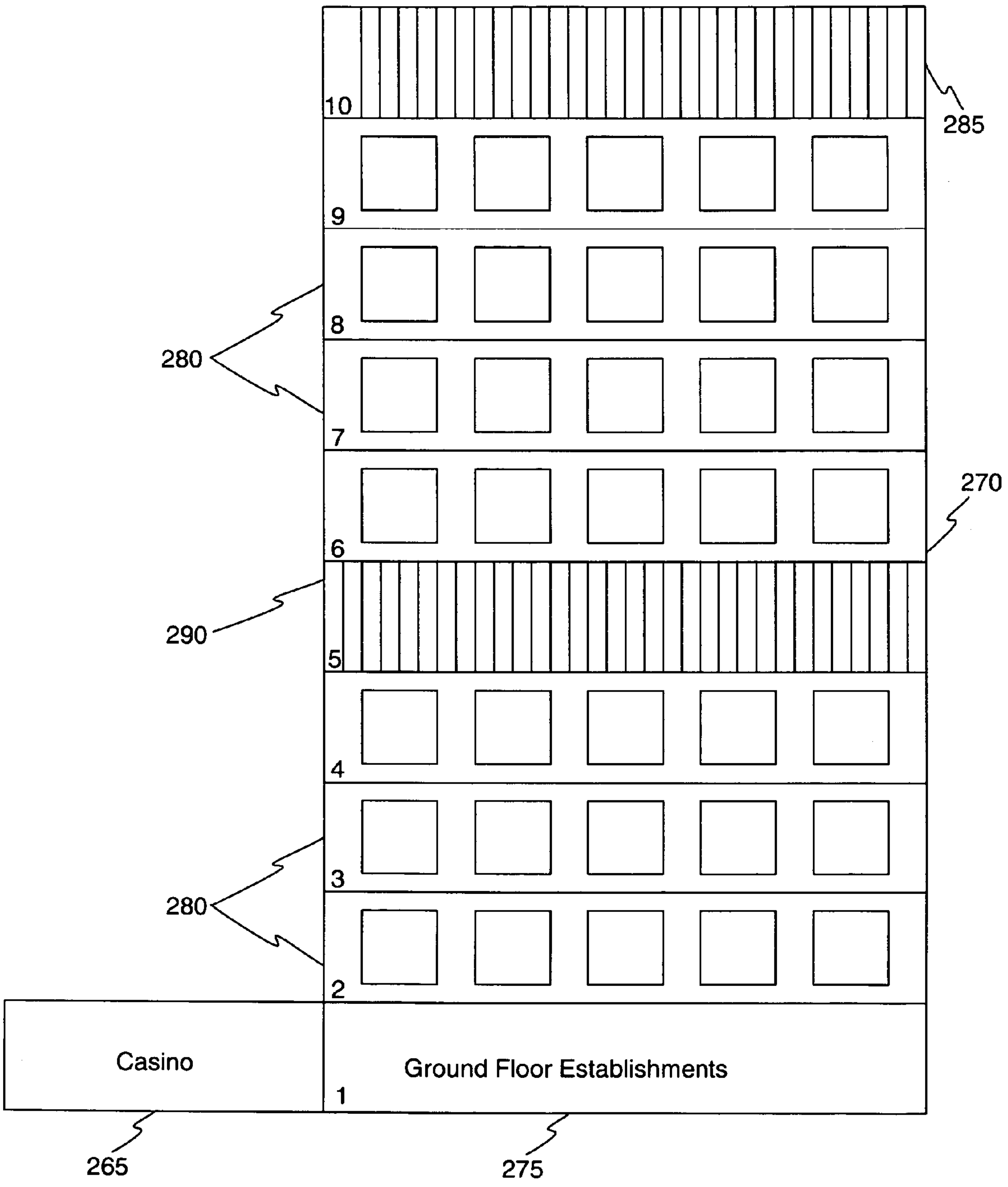
FIG. 4 presents a view of a gaming site that includes a hotel/casino complex wherein the hotel rooms are illustrated as being at different elevations from public areas.

Reference is now made to FIG. 4 wherein a hotel/casino complex is presented. The illustration, in conjunction with the following description, details the flexibility contemplated by the mobile gaming system and the associated mobile gaming device as described herein. The complex is shown as comprising a casino 265 and a tower 270 having 10 floors. It should be recognized that the numbers of floors shown in FIG. 4 is only exemplary, and that the hotel rooms of hotel/casino complexes may be in structures with either a fewer number of floors or a greater number of floors. The casino 265 can be directly incorporated into the same physical structure as the tower 270, or alternatively, the two may be separately situated in adjacent relation to one another as shown.

The casino 265 is shown at its traditional elevation at ground level. Further contemplated as being on this level, and collectively described as ground floor establishments 270 as part of floor 1 of the tower 270, are such other public areas where gaming is lawfully permitted which may include restaurants and bars.

Floors 2-4 and 6-9 of the tower 275 are shown as having hotel rooms, collectively identified as 280. In contrast to the public areas described above, hotel rooms are non-public areas in the complex. As such, gaming operators do not monitor inside the hotel rooms 280 and thus cannot determine with certainty whether minors, who are prohibited from gaming, are using a mobile gaming device or other acts of fraud are occurring. In order to substantially eliminate this possibility, gaming operators ban mobile gaming in hotel rooms 280, as per applicable laws and regulations.

Consequently, as shown on the drawing, mobile gaming is prohibited on floors 2-4 and 6-9 of tower 275 as corresponding to floors with hotel rooms 280. However, there are many hotel/casino complexes where establishments, such as exclusive restaurants, clubs or lounges are located on floors above ground level within the tower 275. As illustrated in FIG. 4, the top floor, identified as floor 10, of the tower 275 has a restaurant 285. This is defined as the type of public area, like the restaurants described earlier as part of the ground floor establishments 270, where gaming is permitted.

In addition, floor 5 of the tower 275 in this illustration is contemplated as a lounge 290. This is also defined as the type of public area where gaming is permitted. Thus, as shown, the prohibition of mobile gaming that applies to floors 2-4 and 6-9 of the tower 275 does not apply to floors 1, 5 and 10.

As such, when the comparator 210 of the inventive mobile gaming device is programmed with the authorized elevations, the elevations associated with floors 5 and 10, corresponding to the lounge 290 and restaurant 285, are specifically set forth as authorized elevations where gaming is permitted. This emphasizes a particular advantage of the mobile gaming device and the inventive mobile gaming system wherein various elevations or elevation ranges are identified as permitted gaming elevations and other elevations are identified as prohibited gaming elevations. The decision to disable the mobile gaming device or allow gaming to proceed, as the situation requires, is based on accurate and efficient elevation recognition.

Figure 5:
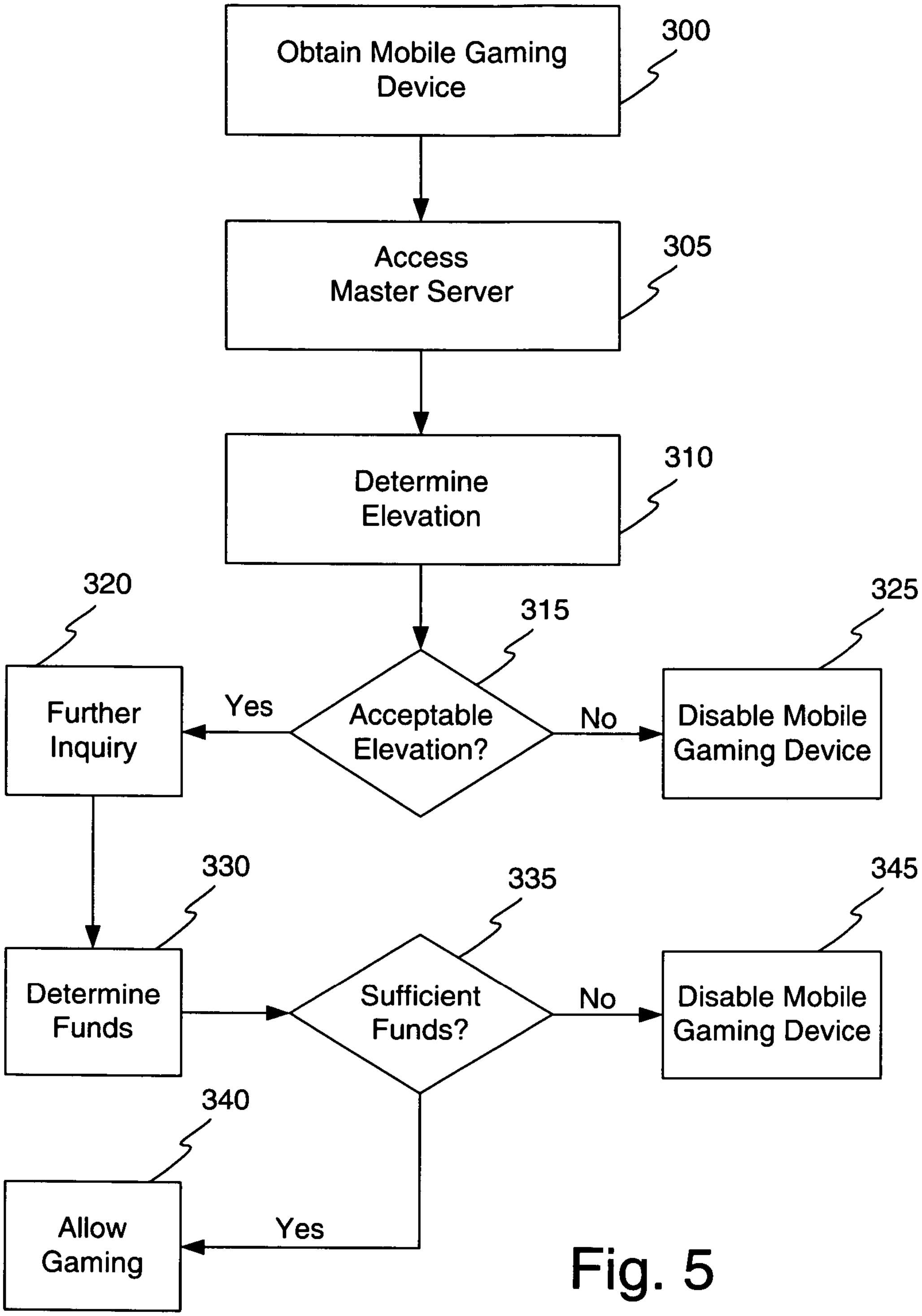
FIG. 5 illustrates an operational flow diagram of an exemplary method of operation.

FIG. 5 presents an operational flow diagram of an example method of operation. At step 300, a user obtains a mobile gaming device from the gaming operator, such as for example at a cashier's cage. The gaming operator may designate any one or more areas on the property as procurement and return locations for mobile gaming devices. A master server is provided to facilitate and manage the mobile device operation. The user actuates the mobile gaming device to access the master server in preparation for using the device for gaming at step 305. It is contemplated that the mobile gaming system, such as the server or mobile gaming device, has been preprogrammed with authorized elevations and non-authorized elevations corresponding to areas of the complex at which gaming is allowed and not allowed.

In accordance with the present invention, since the elevation of certain areas where gaming is permitted is different from the elevation of certain areas where gaming is prohibited, a list of authorized elevations is established to identify elevations where gaming is permitted and elevations where gaming is prohibited. To facilitate operation of the mobile gaming system in accordance with the establishment of authorized elevations, the mobile gaming device is provided with an elevation recognition element. The elevation recognition element performs an operation to determine the elevation of the mobile gaming device and thus its user as identified at step 310.

Further as described above, the mobile gaming device incorporates a comparator programmed or capable of receiving elevations identified as permitted gaming areas. The elevation of the mobile gaming device as identified by the elevation recognition element registers with the comparator to determine if the user is at an acceptable elevation for gaming. This occurs at step 315. If, at step 315, the comparison operation determines that the mobile gaming device is at an elevation associated with permitted gaming, then the operation advances to step 320. Alternatively, if at step 315 the cooperative operation of the elevation recognition element and the comparator determines that the mobile gaming device is at an elevation associated with prohibited gaming, then the operation advances to step 325. At step 325 the disabling element disables the presentation of a wagering game. The disabling element may comprise software, hardware or a combination of both.

If the user is at an elevation associated with an area in which gaming is permitted, and any further inquiry is satisfied at step 320, an inquiry is made as to whether the user has sufficient funds for continued gaming at step 330. Step 330 may be facilitated by the accounting server, which keeps track of the user's funds and can make the determination of sufficient funds, as at step 335. If so, the user is permitted to proceed with the wagering game as at decision step 340. If, however, the user has drawn down the account below a threshold for more betting, as shown at decision step 345, the presentation of a wagering game is disabled in similar manner as occurs if the user is at an elevation associated with prohibited gaming. Of course, the user may deposit more money into the account to continue play.

In summary, the mobile gaming device of the present invention provides the advantage of promoting play of slot-type and table-type casino games away from the traditional casino floor, while simultaneously restricting the operation of the mobile gaming system in areas where mobile gaming is prohibited. More specifically, if the mobile gaming device is at any unauthorized elevation, such as those associated with the hotel rooms in a tower, the device is disabled to prevent gaming from occurring at those associated unauthorized elevations.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment disclosed herein was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

What is claimed is:

1. A device for use in a mobile gaming system, comprising:
- a housing;
- a wireless interface configured to transmit information to, and receive information from, a master server;
- a user interface configured to receive game input from a user;
- a display screen configured to display a wagering game to a user;
- a memory configured to store machine readable code, the machine readable code utilized in presenting the wagering game to a user;
- a microprocessor configured to execute machine readable code;
- an elevation recognition element configured to generate elevation data;
- a comparator configured to compare the elevation data with one or more authorized elevation ranges corresponding to permitted gaming areas;

- an adjustment element configured to adjust the authorized elevation ranges according to a height of the user; and
- a disabling element configured to selectively disable presentation of the wagering game based on the adjusted comparison while allowing the wireless interface to transmit information to, and receive information from the master server.

2. The mobile gaming device of claim 1, further comprising a comparator configured to perform a comparison between the normalized elevation data determined by the elevation recognition element and one or more authorized elevations to determine when to selectively disable the presentation of the wagering game.

3. The mobile gaming device of claim 1, wherein the elevation recognition element comprises an altimeter.

4. The mobile gaming device of claim 3, wherein the altimeter is configured to measure air pressure.

5. The mobile gaming device of claim 3, wherein the altimeter comprises a radio signal emitter.

6. The mobile gaming device of claim 5, wherein the radio signal emitter is configured to emit a radio signal and measure the length of time taken for the radio signal to reflect from a surface back to the radio signal emitter.

7. A system for providing mobile gaming, comprising:
- a master server configured to receive, store and transmit information about a user; and
- at least one mobile gaming device, the mobile gaming device comprising:
  - a housing;
  - a wireless interface configured to transmit information to, and receive information from, the master server;
  - a user interface configured to receive game input from a user;
  - a display screen configured to display information to a user;
  - a memory configured to store machine readable code, the machine readable code utilized in presenting a wagering game to a user;
  - a microprocessor configured to execute machine readable code;
  - an elevation recognition element configured to generate elevation data;
  - a comparator configured to compare the elevation data with one or more authorized elevation ranges corresponding to permitted gaming areas;
  - an adjustment element configured to adjust the authorized elevation ranges according to a height of the user; and
- a disabling element configured to selectively disable presentation of the wagering game based on the adjusted comparison and an amount of funds within an account of the user while allowing the wireless interface to transmit information to, and receive information from the master server.

8. The mobile gaming system of claim 7, wherein the mobile gaming device further comprises a comparator configured to perform a comparison between an elevation determined by the elevation recognition element and one or more authorized elevations to determine when to selectively disable the presentation of the wagering game.

9. The mobile gaming system of claim 7, wherein the elevation recognition element comprises an altimeter.

10. The mobile gaming system of claim 9, wherein the altimeter is configured to measure air pressure.

11. The mobile gaming system of claim 9, wherein the altimeter comprises a radio signal emitter.

12. The mobile gaming system of claim 11, wherein the radio signal emitter is configured to emit a radio signal and measure the length of time taken for the radio signal to reflect from a surface back to the radio signal emitter.

13. A method of operating a mobile gaming system, comprising the steps of:

establishing one or more authorized elevations that correspond to areas where mobile gaming is permitted;

providing to a user at least one mobile gaming device that comprises an elevation recognition element configured to determine a mobile gaming device elevation;

determining a mobile gaming device elevation, wherein the mobile gaming device elevation comprises an elevation at which the mobile gaming device is located;

comparing the mobile gaming device elevation to one or more authorized elevations;

adjusting the authorized elevations according to a height of the user;

responsive to the comparing and the adjusting, permitting gaming using the mobile gaming device when the mobile gaming device elevation is within the one or more adjusted authorized elevations, and not permitting gaming using the mobile gaming device when the mobile gaming device elevation is outside the one or more adjusted authorized elevations; and permitting non-gaming operations using the mobile gaming device regardless of whether the mobile gaming device elevation is within or outside the one or more authorized elevations.

14. The method as in claim 13, wherein the mobile gaming device elevation is determined using an elevation recognition element comprising an altimeter.

15. The method as in claim 14, wherein the altimeter is configured to measure air pressure.

16. The method as in claim 14, wherein the altimeter comprises a radio signal emitter.

17. The method as in claim 16, wherein the radio signal emitter is configured to emit a radio signal and measure the length of time taken for the radio signal to reflect from a surface back to the radio signal emitter.

18. The method of claim 14, wherein the non-gaming operations are concierge, non-wagering advertising, or non-wagering entertainment operations.

19. A device for use in a mobile gaming system, comprising:

a housing;

a wireless interface configured to transmit information to, and receive information from, a master server;

a user interface configured to receive game input from a user;

a display screen configured to display information to a user;

a memory configured to store machine readable code, the machine readable code utilized in presenting a wagering game to a user;

a microprocessor configured to execute machine readable code;

an elevation recognition element configured to determine an elevation at which the device is located and generate elevation data;

a comparator configured to compare the elevation data with one or more authorized elevation ranges corresponding to permitted gaming areas and generate data based on the comparison;

an adjustment element configured to adjust the authorized elevation ranges according to a height of the user; and a disabling element configured to selectively enable and disable presentation of the wagering game based on the data, wherein the disabling element is configured to:

enable gaming when the data indicates that the elevation at which the device is located is within the one or more authorized elevation ranges and when the data indicates that an account of the user contains sufficient funds for gaming; and disable gaming when the data indicates that the elevation at which the device is located is outside the one or more authorized elevation ranges or when the data indicates that the account of the user contains insufficient funds for gaming, while allowing the wireless interface to transmit information to, and receive information from the master server.

20. The mobile gaming device of claim 1, wherein the disabling element is configured to selectively disable presentation of the wagering game based on information regarding the elevation data and the user's height received from the comparator.

21. The mobile gaming system of claim 7, wherein the disabling element is configured to selectively disable presentation of the wagering game based on information regarding the elevation data and the user's height received from the comparator.

* * * * *